Figure 1:
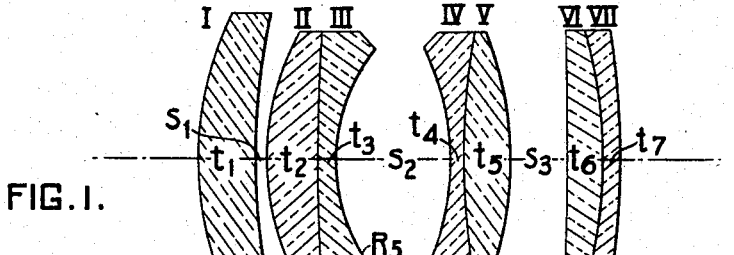

March 7, 1944.   G. H. AKLIN   2,343,627
LENS
Filed Oct. 8, 1941

| F=100 mm | | | | f/2.5 |
|---|---|---|---|---|
| LENS | $N_D$ | V | RADII | THICKNESSES |
| I | 1.611 | 57.2 | $R_1 = + 40.1$ mm | $t_1 = 7.0$ mm. |
| | | | $R_2 = + 84.4$ | $S_1 = 1.4$ |
| II | 1.611 | 58.8 | $R_3 = + 31.6$ | $t_2 = 6.7$ |
| III | 1.573 | 42.5 | $R_4 = + 292.0$ | $t_3 = 1.9$ |
| | | | $R_5 = + 21.6$ | $S_2 = 14.6$ |
| IV | 1.617 | 36.6 | $R_6 = - 29.9$ | $t_4 = 2.0$ |
| V | 1.745 | 46.4 | $R_7 = + 102.0$ | $t_5 = 5.3$ |
| | | | $R_8 = - 41.6$ | $S_3 = 7.2$ |
| VI | 1.755 | 47.2 | $R_9 = - 441.0$ | $t_6 = 4.4$ |
| VII | 1.575 | 41.4 | $R_{10} = - 57.1$ | $t_7 = 2.0$ |
| | | | $R_{11} = - 99.5$ | BF = 70.5 mm. |

GEORGE H. AKLIN
*INVENTOR*

BY Newton M. Perrins

ATTORNEY

Patented Mar. 7, 1944

2,343,627

UNITED STATES PATENT OFFICE 2,343,627

LENS

George H. Aklin, Rochester, N. Y., assignor to Eastman Kodak Company, Rochester, N. Y., a corporation of New Jersey Application October 8, 1941, Serial No. 414,134

7 Claims. (Cl. 88—57)

This invention relates to lenses and particularly to high aperture photographic objectives.

It is an object of the invention to provide a high aperture lens with high covering power and good correction for the various aberrations including spherical aberration, chromatic aberration, lateral color, curvature of field, astigmatism, sine condition, coma, distortion, and vignetting.

Specifically it is an object of the invention to provide a high quality objective covering over 25 degrees from the axis and capable of being used at f/2.5 or faster and with exceptionally good rim ray agreement—sometimes described as good correction of oblique spherical aberration.

Photographic objectives, except for some borderline cases, fall readily into certain recognized types. The present invention applies to a very definite type, namely, that having four components the outer two of which are positive and the inner two are compound and meniscus highly concave toward each other. The majority of outer positive components shown in the prior art are single elements, although often they are compound cemented or even consist of separated, i. e., airspaced elements. The inner meniscus components are usually doublets but sometimes are cemented triplets. The present invention is concerned with the structure of the rear half of the objective and is applicable to all of the above variations in the two front components, but is here described with reference to the simplest form of these front two components since it is most useful in this form of this type of objective. On the other hand the invention may be combined with a front positive component as shown in my copending application Serial No. 335,783, filed May 17, 1940, now Patent No. 2,262,985, and is preferably combined with certain features of the third component shown by Herzberger in his copending application Serial No. 335,785, also filed May 17, 1940, now Patent No. 2,289,779. Reference is also made to my Patents Nos. 2,252,681 and 2,252,682 and copending application 335,786, filed May 17, 1940, by Frederick and Herzberger, now Patent 2,262,998.

According to one form of the present invention, which is primarily concerned with the rear component and also with the third component numbering from the front, the upper rim ray agreement is improved by making the rear component a doublet consisting of a positive element cemented to the front of a meniscus negative element convex toward the rear whose refractive index is less than that of the positive element by more than 0.12 and preferably more than 0.15. Preferably this rear component is meniscus in shape concave toward the front of the objective. However, this component should not be too strongly meniscus but should be arranged so that the radius of curvature of its front surface is greater than twice the focal length of the objective.

A preferred form of my lens also involves a third component which is a cemented doublet the rear element of which has a refractive index greater than 1.7 and at least .05 greater than that of the front element as taught by Herzberger, and has the added feature of having a thickness less than one-tenth of the focal length of the objective.

This thinness of the third component affects the aberration, as is described in my Patent 2,252,681, tending to correct it the more the thinner the component, and also tending to improve the rim ray agreement.

In trying to make use of this relationship by making the said component still thinner, great difficulty was experienced because of the resulting overcorrection of the aberration and also because of an inward curvature of the field. According to this form of the present invention, however, this difficulty is overcome by making the front component more strongly meniscus than heretofore or the rear component meniscus with its front surface concave instead of in the more usual biconvex form or both. These two changes themselves tend to improve the astigmatism especially for the extreme zones of the field, but the former tends to under-correct the aberration while the latter tends to cause a backward curving field, thus these changes cannot easily be used by themselves to improve the astigmatism, but they combine advantageously with the feature of thinness of the third component resulting in good correction of these two first order or Seidel aberrations and also the said improvements in the higher order aberrations.

The most advantageous shapes of the positive components of an objective according to this form of the invention are as follows: The rear surface of the front component should be concave to the rear with a radius of curvature between $2f$ and $0.5f$ where $f$ is the focal length of the objective and the front surface of the rear component should be concave to the front with a radius of curvature between $2f$ and infinity. Either the front or the rear positive component alone may to advantage be made according to these specifications, but it is preferred that both be so constructed.

Preferably the features relating to the indices of the rear component are combined with one or more of the other features to produce a lens with superior correction of two or more of the higher order aberrations.

In the foregoing description the term "rim rays" refers to the upper and lower rays of an oblique pencil, the upper rays being those that cross the axis first in approaching the front of the objective, i. e., the upper rays of an oblique pencil coming up from below the axis to the front surface of the lens. "Rim ray agreement" refers to the image plane and to the proximity of the rim rays to the central rays as they strike the image plane after passing through the lens.

In the accompanying drawing:

Fig. 1 shows an objective according to the preferred form of the objective with constructional data for one embodiment.

Figure 2:
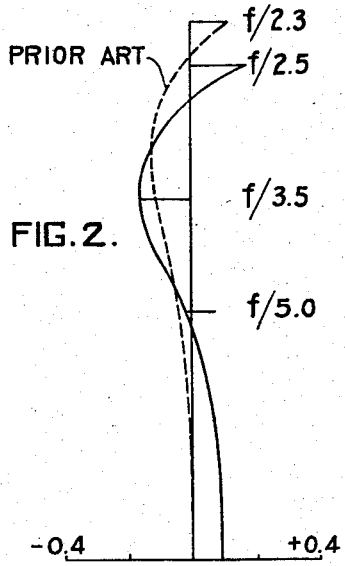
Figure 3:
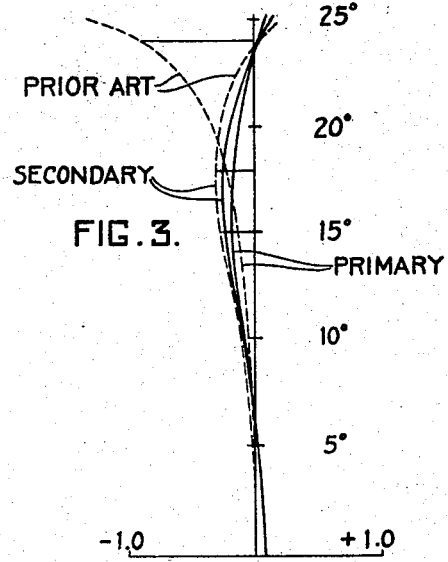

Figs. 2 and 3 respectively show the aberration and field curves for the objective shown in Fig. 1 compared with curves typical of the prior art.

The specifications of the lens shown in Fig. 1 are as follows:

$f = 100$ mm.      $f/2.5$

| Lens | $N_D$ | V | Radii | Thicknesses |
|---|---|---|---|---|
| I | 1.611 | 57.2 | $R_1 = +40.1$ mm. | $t_1 = 7.0$ mm. |
|   |       |      | $R_2 = +84.4$ | $S_1 = 1.4$ |
| II | 1.611 | 58.8 | $R_3 = +31.6$ | $t_2 = 6.7$ |
| III | 1.573 | 42.5 | $R_4 = +292$ | $t_3 = 1.9$ |
|    |       |      | $R_5 = +21.6$ | $S_2 = 14.6$ |
| IV | 1.617 | 36.6 | $R_6 = -29.9$ | $t_4 = 2.0$ |
| V | 1.745 | 46.4 | $R_7 = +102$ | $t_5 = 5.3$ |
|   |       |      | $R_8 = -41.6$ | $S_3 = 7.2$ |
| VI | 1.755 | 47.2 | $R_9 = -441$ | $t_6 = 4.4$ |
| VII | 1.575 | 41.4 | $R_{10} = -57.1$ | $t_7 = 2.0$ |
|     |       |      | $R_{11} = -99.5$ | B. F. = 70.5 mm. |

In the above table and on the accompanying drawing $f$ refers to the focal length of the lens, the Roman numerals refer to the elements numbered from the front, $N_D$ is the index of refraction for the D line of the spectrum, V is the dispersive index, R, $t$ and S refer to the radii of curvature, the thicknesses and the spacings respectively numbered from the front and B. F. refers to the back focal length of the lens.

It will be noted that in this objective the rear component is meniscus and consists of a positive element cemented to the front of a meniscus negative element concave to the front whose refractive index is 0.18 less than that of the positive element, and the front surface of this component is concave with a radius of curvature $R_9$ between $-200$ and $\infty$. Also the third component is a cemented doublet the rear element of which has a refractive index of 1.745 which is larger than that of the front element by 0.128, and the thickness $t_4 + t_5$, of this component is 0.073. Furthermore the radius of curvature $R_2$ of the rear surface of the front component is 84.4 mm. which is between 200 and 50 mm.

Attention is drawn to the unusual manner in which the spherical aberration and field curves are drawn in Figs. 2 and 3. Due to the unusual shape of the field curve the plane of the best image was found to be about 0.10 mm. closer to the objective than the paraxial focus. In the final mathematical touching up of the design of the lens, accordingly, the spherical aberration was adjusted in the direction of less overcorrection so as to give the best image in this plane. In the aberration curves for this lens, accordingly, the vertical axis does not coincide with the Gaussian focal plane, while the example of prior art is shown in the usual way. Also it was found necessary to use a horizontal scale somewhat exaggerated compared to some standards, in order adequately to show the small amount of aberrations still remaining in this objective.

The prior art shown in these figures refers to an earlier objective designed by me, and is the best objective of this type and aperture known to me previous to the present invention. It will be noted that the useful field has been greatly extended and at the same time the astigmatism of all zones has been decreased practically to zero and that this has been done with only a slight increase in the zonal spherical aberration which is still within useful tolerances. The rim ray agreement has also been improved, thus greatly improving the sharpness of detail in the image over the field taken as a whole.

Having thus described one example of my invention, I wish to point out that the invention is not limited to the example shown but is of the scope of the appended claims.

I claim:

1. A high aperture objective of the type comprising four coaxial components separated by air of which the two outer ones are positive and the two inner ones are compound menisci highly concave toward each other, characterized by the rear positive component being a doublet consisting of a positive element cemented to the front of a negative element whose refractive index is less than that of the positive element by more than 0.12 and by said rear component being meniscus in shape concave toward the front, with the radius of curvature of its front surface longer than twice the focal length of the objective.

2. A high aperture objective of the type comprising four coaxial components separated by air of which the two outer ones are positive and the two inner ones are compound menisci highly concave toward each other, characterized by the rear positive component being a doublet consisting of a positive element cemented to the front of a meniscus negative element convex to the rear whose refractive index is less than that of the positive element by more than 0.15.

3. A high aperture objective of the type comprising four coaxial components separated by air of which the two outer ones are positive and the two inner ones are compound menisci highly concave toward each other and of which the third component numbering from the front is a cemented doublet having a refractive index in its rear element greater than 1.70 and greater than that of the front element of the same component by at least 0.05, characterized by the thickness of the third component being less than $0.1f$ where $f$ is the focal length of the objective and by the rear surface of the first component being concave to the rear with a radius of curvature greater than $0.5f$ and less than $2.0f$.

4. A high aperture objective of the type comprising four coaxial components separated by air of which the two outer ones are positive and the two inner ones are compound menisci highly concave toward each other and of which the third component numbering from the front is a cemented doublet having a refractive index in its rear element greater than 1.70 and greater than that of the front element of the same component by at least 0.05, characterized by the thickness of the third component being less than $0.1f$ where f is the focal length of the objective and by the front surface of the rear component being concave to the front with a radius of curvature greater than $2f$.

5. An objective according to claim 3 characterized also by the front surface of the rear component being concave with a radius of curvature greater than $2f$.

6. An objective according to claim 4 characterized also by the rear component being a doublet consisting of a positive element cemented to the front of a negative element whose refractive index is less than that of the positive element by more than 0.15.

7. A photographic objective having substantially the following specifications:

| Lens | $N_D$ | V | Radii | Thicknesses |
|---|---|---|---|---|
| I | 1.61 | 57 | $R_1=+0.4f$ | $t_1=0.07f$ |
|  |  |  | $R_2=+0.8f$ | $s_1<0.02f$ |
| II | 1.61 | 59 | $R_3=+0.3f$ | $t_2=0.07f$ |
| III | 1.57 | 42 | $R_4>+2.5f$ | $t_3=0.02f$ |
|  |  |  | $R_5=+0.2f$ | $s_3=0.15f$ |
| IV | 1.62 | 37 | $R_6=-0.3f$ | $t_4=0.02f$ |
| V | 1.74 | 46 | $R_7=+1.0f$ | $t_5=0.05f$ |
|  |  |  | $R_8=-0.4f$ | $s_5=0.07f$ |
| VI | 1.76 | 47 | $R_9=-4.4f$ | $t_6=0.04f$ |
| VII | 1.57 | 41 | $R_{10}=-0.6f$ | $t_7=0.02f$ |
|  |  |  | $R_{11}=-1.0f$ |  | where the first column gives the lens elements in Roman numerals in order from front to rear and indicates air spaces by dashes and where $f$ is the focal length of the objective, $N_D$ is the index of refraction for the D line of the spectrum, V is the dispersive index, R, $t$ and $s$ refer respectively to the radii of curvature of the refractive surfaces, the thicknesses of the elements, and the air spaces between the elements, the subscripts on these refer to the surface, the elements, and the spaces numbered consecutively from the front, and the + and − signs in the fourth column correspond to the surfaces which are respectively convex and concave to the front.

GEORGE H. AKLIN.